Dec. 30, 1969     JAMES E. WEBB     3,486,279
ADMINISTRATOR OF THE NATIONAL AERONAUTICS
AND SPACE ADMINISTRATION
DEPLOYABLE LATTICE COLUMN

Filed Nov. 30, 1967                  2 Sheets-Sheet 1

*INVENTOR.*
HAGEN R. MAUCH

BY

ATTORNEYS

Dec. 30, 1969       JAMES E. WEBB       3,486,279
ADMINISTRATOR OF THE NATIONAL AERONAUTICS
AND SPACE ADMINISTRATION
DEPLOYABLE LATTICE COLUMN

Filed Nov. 30, 1967                    2 Sheets-Sheet 2

*INVENTOR.*
HAGEN R. MAUCH

BY
ATTORNEYS

United States Patent Office 3,486,279
Patented Dec. 30, 1969

3,486,279
DEPLOYABLE LATTICE COLUMN
James E. Webb, Administrator of the National Aeronautics and Space Administration, with respect to an invention of Hagen R. Mauch, Nahant, Mass., assignor to Astro Research Corporation, a corporation of California
Filed Nov. 30, 1967, Ser. No. 686,919
Int. Cl. E04h 12/18
U.S. Cl. 52—108                                    12 Claims

ABSTRACT OF THE DISCLOSURE

A column which can be rapidly deployed from a small collapsed length to an extended length. The column comprises many individually collapsible sections connected in tandem, each section having a triangular cross-section. Each column section has three face structures, or subsections, and each face structure has a rectangular shape of appreciable height when deployed and a small height when collapsed. The face structures, or subsections, are maintaned in a rectangular shape by two diagonal wires, each tied to opposite corners of the rectangle to prevent collapse. However, one of the diagonal wires includes a spring to allow its extension and consequent collapse of the rectangular face structure. The column may be collapsed by collapsing each section, or deployed from a collapsed state by extending each section.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Field of the invention

This invention relates to a column-like member for deployment from a collapsed state to an extended state.

Description of the prior art

Large structural members which can be carried as a small package and rapidly deployed to full length are required in many applications. For example, soldiers or workmen in remote locations often must erect columns to support antennas high above the ground, and some outer space applications require easily erected column members for deploying large antennas automatically. Many such applications require a column of low dead weight which can support high loads, and which can be rapidly deployed with a minimum of manpower and tools. In many applications, it is also desirable to provide a column whose members occupy very little area when deployed, to thus minimize wind resistance and lessen the likelihood of meteoroid damage.

Of the many types of column structures available, the lattice type column has been found to be among the best for most field-type installations. Such a column typically has several longerons extending along its length. The longerons are braced by many short batten members extending perpendicular to the longerons, and there are included diagonal members for bracing the longerons and battens. A lattice column has a high strength to weight ratio and low wind resistance. While several types of easily deployable column structures are known, such as telescoping tubes, they do not have the desirable features of the lattice type columns.

OBJECTS AND SUMMARY OF THE INVENTION

Accordingly, one object of the present invention is to provide an easily deployable column of high strength to weight ratio.

Another object is to provide a lattice-type column which is easily deployed from a collapsed state.

In accordance with the present invention, a lattice type column is provided which can be carried as a package of small height and which can be deployed as a tall column, rapidly and with few or no tools. When deployed, the column is similar to a typical lattice column, with several longerons braced along their length by battens and diagonal members. Each face of the column is comprised of many rectangles connected in tandem, with each pair of adjacent battens defining one rectangle. Each rectangle is constructed so that it can be easily collapsed to considerably reduce its height.

When the column is deployed, each rectangle is extended with the sides thereof being braced by two diagonal tension members. In order to collapse a rectangle, one of the diagonal tension members must be lengthened. This is accomplished in accordance with the present invention by incorporating a spring in one of the tension members which allows the member to be lengthened when sufficient force is applied. Compression forces on the column do not tend to elongate the extendable tension member, and the column is rigid in compression (and also in tension). However, torsion applied to the column in one direction tends to elongate the spring in the extendable tension member and allow the rectangle to collapse.

When a rectangular subsection which is part of one column face collapses, it does not collapse in a single plane, but rather into a three dimensional figure with four sides. During collapse, the extendable diagonal member undergoes extension until a certain point is reached, after which it contracts. Thus, torsion is required during only the first part of the collapse. In a similar manner, deployment from a collapsed position requires the application of torque to extend the extendable tension member until the point is reached at which it begins to contract. As a result, deployment of the column from a collapsed position requires the application of torque to partially deploy it, after which the column sections are self-deploying.

Normally, a rectangular subsection with two wire diagonals could collapse into a three dimensional figure without extending either of the wire diagonals. However, each rectangular subsection is only one face of a multi-face column, such as a column of triangular cross-section. The other two faces prevent the collapse of a rectangle unless one of its wire diagonals is extended.

In one embodiment of the invention, the rectangles are constructed from rigid members pivotally joined together. In another embodiment, the sides of the rectangles are portions of continuous flexible longerons which extend along the length of the deployed column. In the latter embodiment, the longerons are bent into a circle when the column is collapsed. The bent longerons tend to spring back toward a straight condition in which the column is deployed. The tendency of the longerons to spring into shape helps to overcome some of the spring tension of the extendable diagonals, and less torque is required for deployment.

The invention will best be understood from the following description when read in conjunction with the accompanying drawings.

DESCRIPTION OF THE PREFERRED EMBODIMENTS

Figure 1:
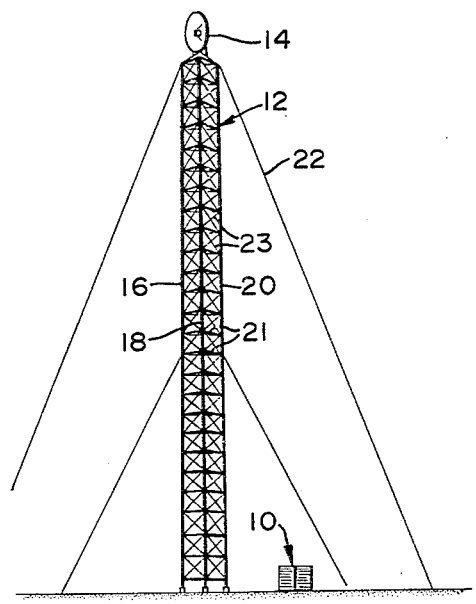
FIGURE 1 is a pictorial view of a collapsed column and of a deployed column in a typical use.

FIGURE 1 illustrates a collapsed column 10 and deployed column 12, the columns being identical in construction and readily changeable between these two configurations. The deployed column 12 is shown in a utilization as an antenna mast to support an antenna 14 above the ground. The column is of a lattice-type construction with a triangular cross-section and has three longerons 16, 18 and 20 extending along its length. A multiplicity of battens 21 extends perpendicular to the longerons to tie them together, and a multiplicity of diagonal members 23 braces the battens and longerons. As in the case of even permanent columns used as antenna masts, guy wires 22 may be used to prevent toppling of the column.

Figure 2:
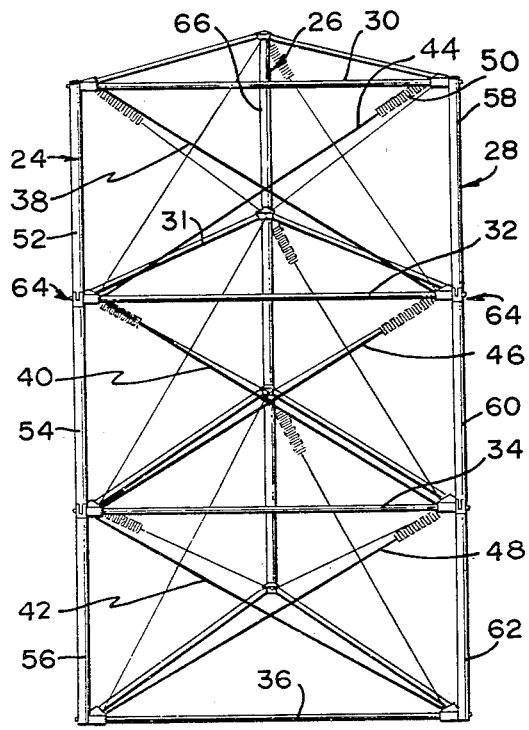
FIGURE 2 is an isometric view of a short deployable column constructed in accordance with the invention, in a fully deployed configuration.

FIGURE 2 is an illustration of a fully deployed short column constructed in accordance with one embodiment of the invention. In terms of a typical lattice column, the column of FIGURE 2 has three longerons 24, 26 and 28 which extend along its length. The three longerons define the three faces of the column, each face directed along the length of the column. One of the faces is the face between longerons 24 and 28 which lies in the plane of the figure. The longerons 24 and 28 are tied together by four battens 30, 32, 34 and 36. A first set of three diagonal members 38, 40 and 42 serves to brace the longerons and battens. A second set of three diagonal members 44, 46 and 48 also serves to brace the longerons and battens.

In a typical permanent lattice column, only one diagonal member ordinarily would be used for each rectangular face portion, with such diagonal member being a rod capable of withstanding both compression and tension. In the column of FIGURE 2, however, the diagonal members are tension members, capable of withstanding only tension forces, and two of them are required to maintain the rectangular shape. The tension members 38, 40 and 42 are wires which are not capable of extension. The second set of tension members 44, 46 and 48 include springs, such as spring 50, which allow them to be extended when sufficient tensile forces are applied.

Figure 4A:
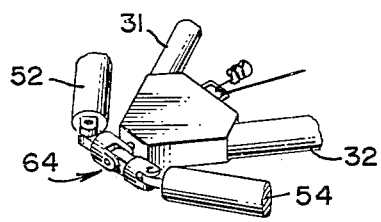
FIGURE 4A is a perspective view of a joint of the column of FIGURE 2 when in a collapsed configuration.

Each of the three longerons 24, 26 and 28 is constructed of three separate rigid members. For example, longeron 24 is constructed of three rods 52, 54 and 56, while longeron 28 is constructed of three rods 58, 60 and 62. The connection of the longeron portions to each other and to the battens is by means of pivotal joints for example, joint 64, which is shown in a collapsed configuration in FIGURE 4A, pivotally connects rods 52 and 54 of one longeron to each other and to battens 32 and 31. Battens 32 and 31 are fixed to each other. The joint 64 is also attached to the tension member 44.

Figure 4:
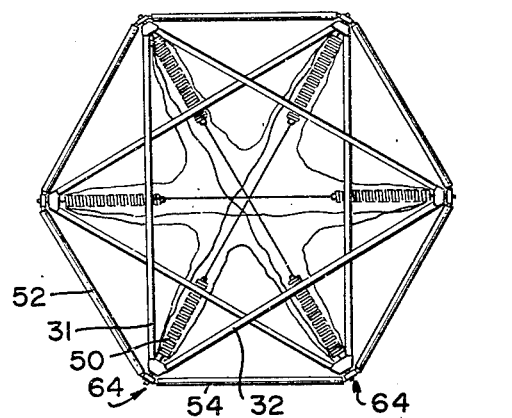
FIGURE 4 is a plan view of the column of FIGURE 2 shown in a fully collapsed configuration.
Figure 3:
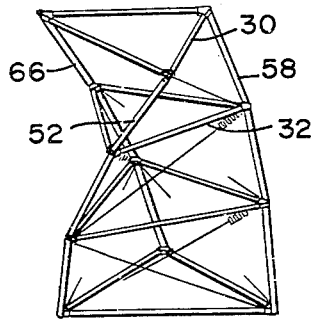
FIGURE 3 is a perspective view of the column of FIGURE 2 in a partially collapsed configuration.

In terms of a deployable or collapsible column, the column of FIGURE 2 can be described as composed of three sections connected in tandem. For example, one section is the top section between the rods 52, 58 and 66. Each of the three sections which comprise the column can be independently collapsed or deployed. FIGURE 3 illustrates the column of FIGURE 2 in a partially collapsed or deployed configuration. FIGURE 4 is a plan view of the column in a fully collapsed configuration. When any section of the column is collapsed, all three faces of the section collapse and its battens, such as battens 30 and 32, are moved together. The manner in which this is achieved is explained below.

Figure 5:
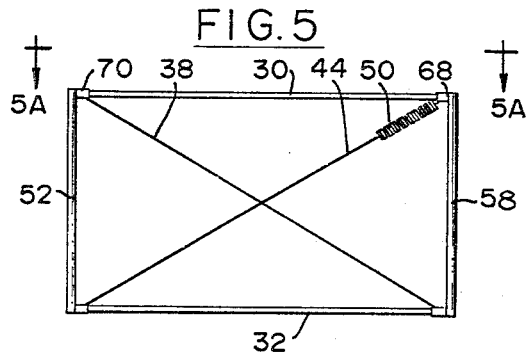
FIGURE 5 is an elevation view of a subsection of the column of FIGURE 2 in a deployed, rectangular configuration.

FIGURE 5 illustrates one of the three faces of a section of the column of FIGURE 2. The rectangular subsection shown in FIGURE 5 comprises the battens 30 and 32 and the longeron rods 52 and 58. The subsection is maintained in a nearly rectangular configuration by the two tension members 38 and 44. If the rectangle were to fold by its upper batten 30 moving to the left, tension member 38 would have to be elongated, so this manner of collapse cannot occur. If the rectangle were to fold to the right, tension member 44 would have to be elongated. This manner of collapse can occur because of the inclusion of spring 50 in the tension member. However, the spring 50 is preloaded so that considerable force moving the batten 30 to the right is required to fold the rectangle.

A compressive force on the column of FIGURE 5, which would be applied parallel to the longeron members 52 and 58, would not cause collapse of the rectangle. The only way in which the entire section can be folded (when it is part of the column) is if a torsion force is applied to the column which tends to move the batten 30 largely to the right. A horizontal or shear force may tend to collapse one rectangle but will be resisted by the other two rectangular elements of the section, so the column is resistant to pure shear forces.

When a torsional force is applied to the column which causes batten 30 to move largely to the right, spring 50 is elongated. The rectangle does not fold in one plane, but instead joint 68 moves into the plane of the figure while joint 70 moves out of the plane of the figure. When complete collapse has occurred, a plan view of the originally rectangular subsection has the configuration shown in FIGURE 5A, with batten 32 shown in the same position in both figures. The other two faces of the column section, which cause the rectangle to assume the configuration of FIGURE 5A are not shown.

Figure 5A:
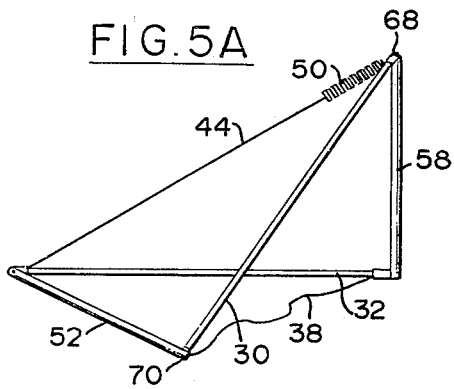
FIGURE 5A is a plan view of the subsection of FIGURE 5 in a collapsed configuration.

During the first portion of collapse of the rectangle of FIGURES 5 and 5A, the spring 50 undergoes expansion, and during the last portion of collapse it undergoes contraction. Thus, in the collapsed configuration of FIGURE 5A, it requires some force to deploy the column subsection. The deployment of an entire column can be accomplished by deploying one section at a time. Each section can be deployed merely by rotating and lifting it up, the only force required being that to overcome the contraction forces of the three springs of that particular column section being lifted. When all of the column sections have been lifted in turn, the column is completely extended. If the ratio of the length of the batten members 32 or 30 to the longeron members 52 or 58 is approximately 1.7, (theoretically 2 times the cosine of 30°) the column will collapse into an hexagonal package, as shown in FIGURE 4.

Figure 6:
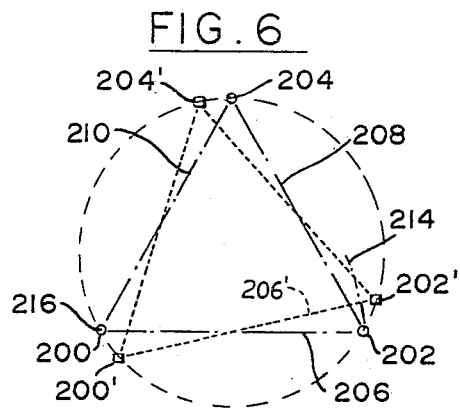
FIGURE 6 is a representational, cross-sectional view of a section of a triangular column constructed in accordance with the invention.
Figure 6A:
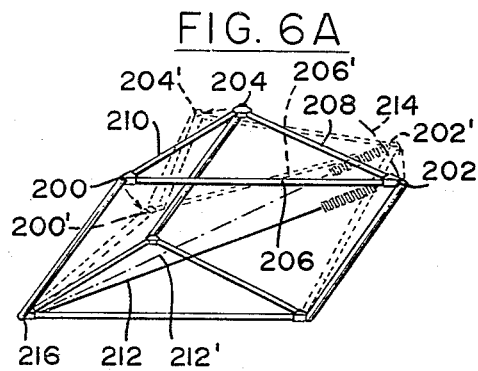
FIGURE 6A is a perspective view of the column section of FIGURE 6.

An understanding of the manner of collapse can be had by considering the diagrammatic cross-sectional view of a column section shown in FIGURE 6, and the perspective view of the same column section as shown in FIGURE 6A. As shown in FIGURE 6, the battens 206, 208 and 210 form an equilateral triangle, whose triangular shape is maintained during rotation into collapse. Joints 200, 202 and 204 therefore rotate along a circle to points 200', 202' and 204' when the section has partially collapsed. As shown in FIGURE 6A, when joint 202 of batten 206 moves to point 202', the diagonal 212 must elongate. Only if joint 200 moved along line 214, which is a radius drawn about the lower joint 216, would diagonal 212 not have to elongate. The triangle forward by the three battens 206, 208, and 210 is rigid, and forces the joint 202 to move out toward point 202', and therefore elongate diagonal 212 to the position 212'.

Figure 7:
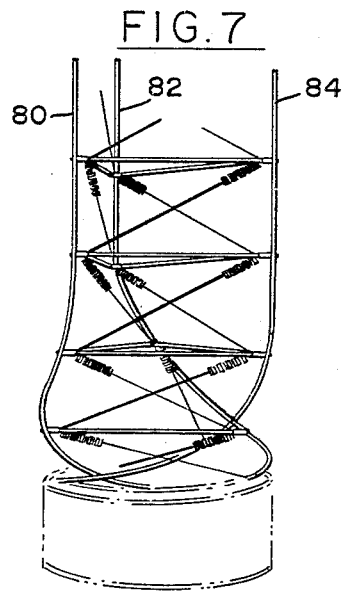
FIGURE 7 is a perspective view of a deployable column constructed in accordance with another embodiment of the invention, in a partially deployed configuration.

FIGURE 7 illustrates another embodiment of the invention, which is similar to that of FIGURE 2 except that the longerons 80, 82 and 84 are not segmented, but are each continuous flexible rods. The longerons bend to allow each section of the column to collapse. However, the longerons maintain a tendency to spring back to a straight shape. This tendency of the bent longerons reduces the amount of force required to overcome the tension in the springs of the diagonal members for deployment of the column. If desired, the spring force of the flexible longerons can be made high enough that the column has an overall tendency to deploy itself, and will do so unless restrained. When collapsed, the column of FIGURE 7 has a circular perimeter defined by the longerons, as opposed to the hexagonal configuration of the folded column of FIGURE 4.

Figure 8:
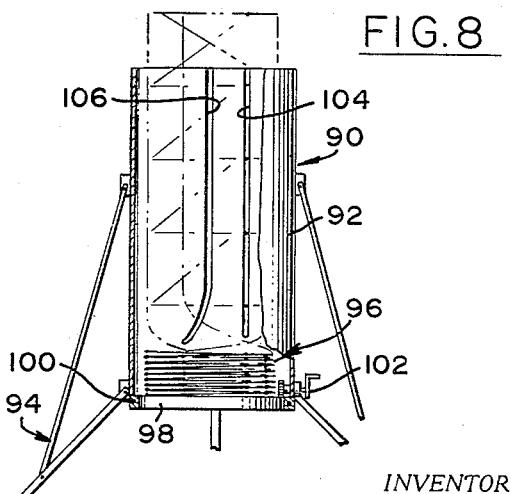
FIGURE 8 is a sectional elevation view of a canistered deployable column constructed in accordance with still another embodiment of the invention.

FIGURE 8 illustrates a canister for holding and readily deploying a collapsed column, such as the column of FIGURE 7. The canister 90 has an outer tube 92 which may be supported on the ground by a tripod arrangement 94. The collapsed column 96 is held at the bottom of the tube 92 and the bottom section thereof is attached to a platform 98 which is rotatably mounted on bearings 100 to the tube 92. A cranking apparatus 102 mounted on the bottom of the tube 92 facilitates rotation of the platform 98 to deploy the column. The inside of the tube includes a straight track 104, for moving the column sections out of the canister. An auxiliary track 106 helps to control the movement.

The deployment of the column is accomplished by rotating the cranking apparatus 102 so that the platform 98 and the collapsed column 96 rotate relative to the track 104 on the tube. When one of the joints along the longeron contacts the track 104 during rotation of the platform, the torque supplied by the track deploys that section of the column by moving the faces of the section into a rectangular configuration. The column section then moves up and out of the canister, with the sections behind it being similarly deployed thereafter. Collapse is accomplished by rotating the cranking apparatus 102 in the opposite direction.

A deployable column has been designed for holding an antenna, as shown in FIGURE 1. The column was designed for a height of 60 feet to hold a 300 pound antenna at its top, in a wind of up to 100 feet per second. The antenna utilized a column with a triangular cross-section having a one foot radius between the column axis and the tips of the triangular cross-sections. Longerons of one half inch diameter and battens of three-eighths inch diameter were utilized, together with springs preloaded to 60 pounds. When completely folded, the column had a height of less than three and one half feet in a package of three feet diameter. It could be deployed with a torque on the order of magnitude of one hundred foot pounds. Such an antenna was designed for deployment by two persons.

The basic construction of the deployable column can be varied in a number of ways. Instead of a triangular cross-section, a column with four or more sides can be utilized if properly braced against collapse in cross-section. Alternatively, only two faces may be employed for each section, with each pair of battens at the top and bottom of the sections forming a rigid V-shape. Each face of a column section may be a shape other than a rectangle when deployed. For example, the nonextensible diagonal member may be lengthened slightly so that the fuly deployed face is not rectangular but is deployable slightly past a rectangle, to withstand slightly greater torque which tends to collapse the column. The faces may utilize a four sided figure with unequal opposite sides, or geometric figures with even more than four sides. The column is rigid in both compression and tension, and therefore can be used as a beam which resists bending.

The deployable columns are useful in a variety of applications. If flexible coverings are applied to the faces, they will provide a column in which the lattice structure is covered. Among the wide range of uses, one application is to enable automatic deployment of a large antenna in space, and another is to provide a deployable container to hold stretchers for patients.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. An extendable structure for movement between a collapsed state and an elongated deployed state comprising:
    a plurality of sections connected in tandem, each section including two or more planar face structures, each of said face structures being comprised of interconnected structural elements movable between a first substantially planar orientation defining a substantial length along said structure in its deployed state and a second three dimensional orientation defining a smaller length along said structure in its collapsed state, at least some of said structural elements of each of said face structures being rigid; and
    means for maintaining each of said face structures in said first orientation, comprising tension resistant members extending across said face structure to prevent its collapse, at least one of said tension resistant members including spring means for enabling its elongation to allow a change in configuration of said face structure between said first and second orientations.

2. An extendable structure as defined in claim 1 wherein:
    each of said face structures is four-sided and has a substantially rectangular shape in said first orientation, with first and second opposite corners and third and fourth opposite corners; and
    said tension resistant members include a first member extending substantially between said first and second opposite corners and a second member including spring means extending substantially between said third and fourth opposite corners.

3. An extendable structure as defined in claim 2 wherein:
    each of said face structures includes first and second longeron members that extend substantially along the length of said extendable structure when said face structure is in said first orientation, and first and second battens which extend substantially perpendicular to the length of said extendable structure; and including
    a third longeron member extending substantially parallel to said first and second longeron members but in a plane spaced from a plane containing said first and second longeron members when said face structure is in said first orientation, to form a triangular cross section;
    a first pair of additional battens, each connecting one end of said first longeron member to one end of saild third longeron member; and
    a second pair of additional battens, each connecting one end of said second longeron member to one end of said third longeron member, whereby to form a column of triangular cross section.

4. An extendable structure as defined in claim 1 wherein:
   each of said sections comprises three of said face structures each movable between said first and second orientations, said face structures being positioned substantially in three different planes directed along the length of said extendable structure when said face structures are in said first orientation.

5. A structure which is deployable to an elongated configuration comprising:
   At least three longeron means for extension substantially aong the length of said structure when it is deployed, said longeron means spaced from each other to form at least three different planes;
   a plurality of batten means for joining said longeron means, each of said batten means oriented substantially perpendicular to the length of said structure when it is deployed, and each batten means having opposite end portions pivotally joined to two longeron means; and
   a plurality of pairs of tension means for bracing said structure, each pair of tension means bracing a portion of said structure which is formed by a first and second of said batten means which tie together first and second of said longeron means, one tension means of each pair having one end tied to said structure adjacent to the joint of said first longeron means and said first batten means and an opposite end tied to said structure adjacent to the joint of said second longeron means and said second batten means, the other tension means of each pair having one end tied to said structure adjacent to the joint of said second longeron means and said second batten means and an opposite end tied to said structure adjacent to the joint between another batten means and another longeron means;
   at least one of said tension means of each pair including spring means for enabling its controlled extension.

6. A structure as defined in claim 5 wherein:
   each of said three longeron means comprises an integral elastic member which has a substantially straight configuration when unbent.

7. A structure as defined in claim 5 wherein:
   each of said longeron means comprises a plurality of rigid rods pivotally connected in tandem.

8. A structure as defined in claim 5 including:
   canister means for holding said structure in a collapsed state wherein said longeron means extend substantially perpendicular to the length of the structure when deployed, said canister means including a tube and a base pivotally joined to said tube for holding said structure, said tube having track means defined therein for preventing the rotation of a portion of said structure when said base is rotated, whereby to enable the deployment of said structure.

9. A deployable elongated structure comprising:
   a plurality of sections connected in tandem along the length of said structure, each section including means defining at least three faces in three different planes which are substantially parallel to the direction of elongation of said structure when it is deployed; and
   each face of each section comprising a pair of longeron members and a pair of rigid batten members having end portions pivotally joined to said longeron members for erection of said face into a substantially rectangular configuration with two pairs of opposite corners, said face including first tension means extending substantially between one pair of opposite corners of said face for resisting the separation of said pair of corners and a second tension means extending substantially between the other pair of opposite corners of said face for resisting the separation of said other pair of corners, at least one of said tension means including means for enabling its controllable elongation upon the application of elongating forces thereto.

10. A deployable elongated structure as defined in claim 9 wherein:
    the longeron members of adjacent sections are respectively parts of integral flexible longerons.

11. A structure movable between a collapsed state and an elongated, deployed state, including a plurality of sections connected in tandem along the length of the structure, each section including at least three faces in three different planes which are substantially parallel to the direction of elongation of such structure when it is deployed, each face of each section comprising a pair of longeron members, a pair of batten members and a pair of diagonal tension members interconnected at the corners of such face, at least some of said members of each of said faces being rigid, and at least one of said members of each of said faces being of varying length to permit movement of each of said faces between a first substantially planar orientation defining a substantial length along such structure in its deployed state and a second three dimensional orientation defining a smaller length along said structure in its collapsed state.

12. An elongated structure movable between a longitudinally extended, deployed state and a longitudinally contracted state, including:
    at least three laterally spaced, longeron means which are straight and extend in the direction of the length of said structure when said structure is extended, but which are deformable into positions substantially perpendicular to the direction of the length of said structure when said structure is contracted;
    a plurality of batten means in planes extending transversely of the direction of the length of said structure and spaced apart in the direction of the length of said structure when said structure is extended, said batten means being stacked when said structure is contracted;
    pivotal connections between each of said batten means and said longeron means, respectively; and
    bracing means comprising diagonal tension members for bracing said structure when it is extended, each tension member extending diagonally from a pivotal connection between one longeron means and one batten means to a pivotal connection between an adjacent longeron means and an adjacent batten means.

References Cited

UNITED STATES PATENTS

| | | | |
|---|---|---|---|
| 1,581,888 | 4/1926 | Thomas | 150—49 |
| 1,947,647 | 2/1934 | Holden | 52—109 |
| 2,150,620 | 3/1939 | Frost | 150—49 |
| 2,299,687 | 10/1942 | Farrand | 52—108 |
| 2,987,148 | 6/1961 | Millard | 52—645 |
| 3,234,682 | 1/1966 | Frankl | 46—24 |
| 3,277,614 | 10/1966 | Marie | 52—2 |

FOREIGN PATENTS 800,787　11/1950　Germany.

HENRY C. SUTHERLAND, Primary Examiner

U.S. Cl. X.R.

52—646